Dec. 1, 1942.  C. S. ASH  2,303,599
DUAL WHEEL BRAKE
Filed Aug. 12, 1941  2 Sheets-Sheet 1

INVENTOR:
CHARLES S. ASH
BY
Morgan, Finnegan & Durham,
ATTORNEYS.

Patented Dec. 1, 1942

2,303,599

UNITED STATES PATENT OFFICE 2,303,599

DUAL WHEEL BRAKE

Charles S. Ash, Milford, Mich.

Application August 12, 1941, Serial No. 406,451

5 Claims. (Cl. 301—6)

The present invention relates to new and useful improvements in dual wheel assemblies and more particularly to a new and useful dual wheel structure having independently rotatable wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
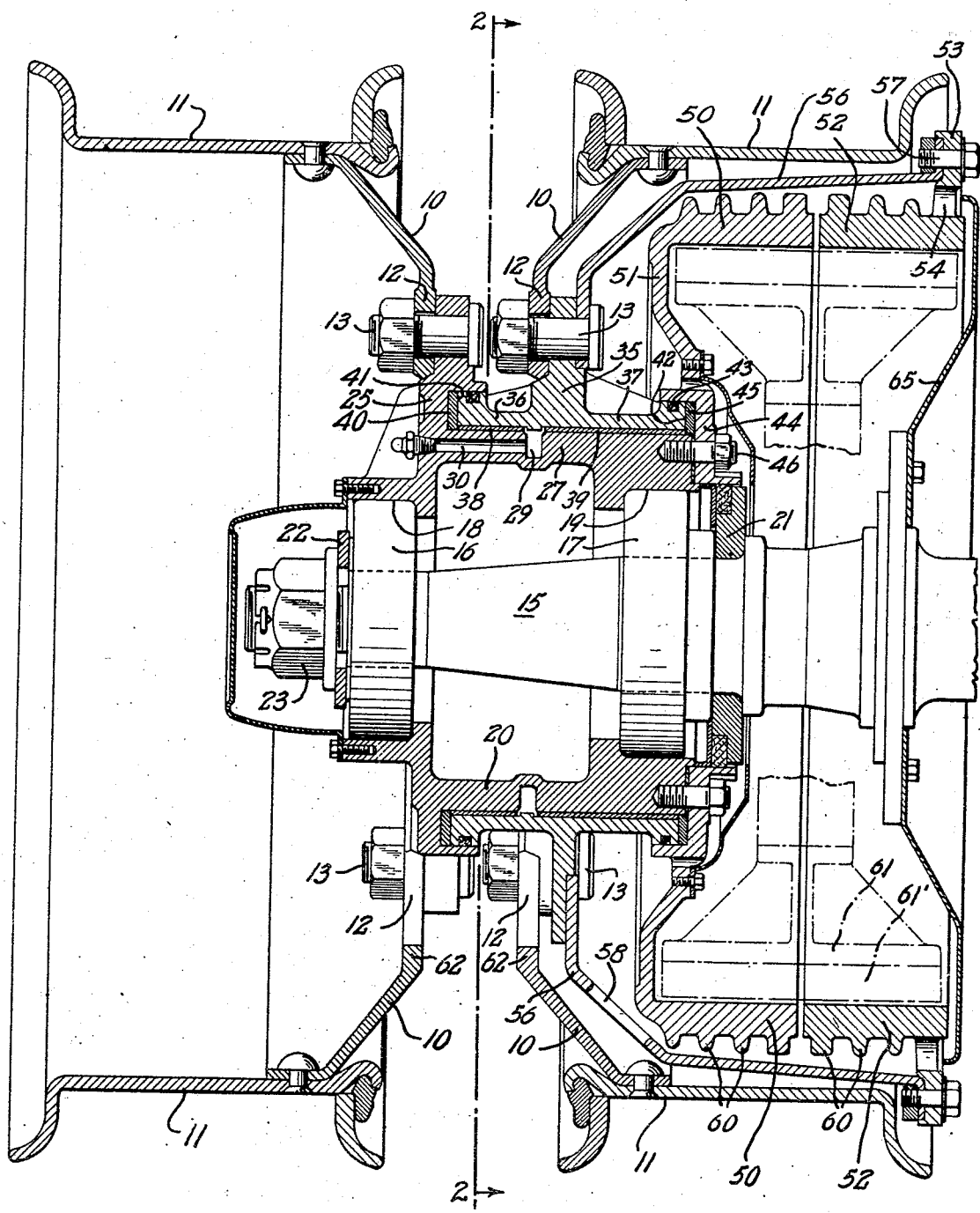
Figure 2:
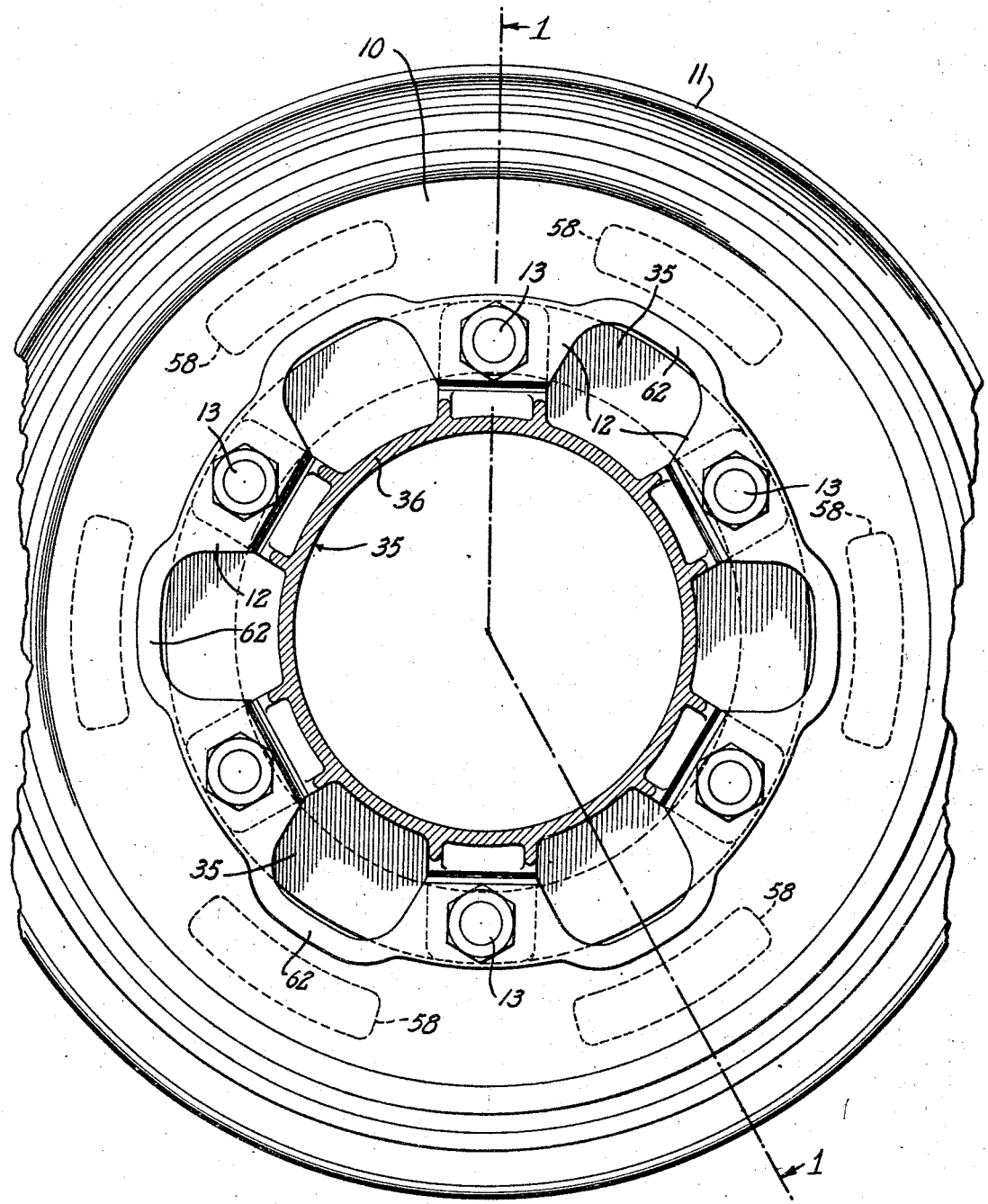

Of the drawings:

Fig. 1 is a sectional view taken along line 2—2 of Fig. 2 showing a typical and illustrative embodiment of the present invention as applied to dual wheels of the non-driven or trailing type; and Fig. 2 is a sectional view taken along line 2—2 of Fig. 1, the wheel axle and bearing mechanism not being shown.

The present invention has for its object the provision of a novel and improved braking mechanism for independently rotatable dual wheels. Another object is the provision of an improved dual wheel construction which is compact in form and has improved brake ventilating means. Still a further object is to provide an improved construction of independently rotatable dual wheels and individual brakes therefor which insures equal and adequate ventilation of the braking means and balanced and efficient operation of said means.

In accordance with the illustrative embodiment of the invention the dual wheel assembly comprises a pair of wheel hubs, one of said hubs being rotatably mounted by suitable bearings upon an axle end, and the second hub being rotatably mounted upon the first, suitable bearing and lubricating means being provided between the two independently rotatable hubs. Suitable wheels and rims are provided, the outer wheel being removably mounted on the first hub, and the inner wheel being similarly mounted on the second hub. A brake drum is fixed to the inner end of the first hub for rotation therewith, and another brake drum is fixed to the second hub by means of a cylindrical member which encloses both brake drums and is attached to the second drum adjacent its inner edge. The brake drums are so constructed that their respective masses adjacent their respective braking surfaces and the braking surfaces themselves are substantially equal, and they are arranged in substantially cylindrical alignment, the drum for the inner wheel being located close to the inner side of the drum for the outer wheel. Ventilation ports are provided in the inner wheel and the cylindrical member enclosing the brake drums to insure the access of cooling air to the drums and the drums may be formed on their outer peripheries with radiation fins.

It will be understood that the foregoing general description and the following detailed description as well, are exemplary and explanatory of the invention but are not restrictive thereof.

Referring now in detail to the illustrative embodiment of the invention as shown in the drawings, the wheel members 10 are preferably duplicates of each other, and may be provided with permanent pneumatic tire mounting rims 11. The wheels are preferably dished and at their radial interior portion are provided with apertured lugs 12 by which they may be secured to the wheel mounting bolts 13.

Where the dual wheel assembly is to be used in connection with a non-driven axle, the wheels are mounted on the axle end 15 by means of the tapered roller bearings 16 and 17, which are spaced apart and received within the usual bearing seats 18 and 19 formed integrally with the hub 20, the inner races of the bearings 16 and 17 being seated on the axle end with the bearing 17 against a ring 21 and the inner race of bearing 16 in contact with the washer 22 which is held by means of the castellated nut 23 on the extreme end of the axle.

The outer wheel hub 20 comprises a radially extending disc-like portion 25 at the outer edge of which are provided the wheel mounting bolts 13, and an inwardly extending cylindrical portion 27 of considerable length which is preferably flame-hardened and ground to provide a true, highly finished, cylindrical bearing surface. The cylindrical portion 27 may be provided with a circumferential annular channel 29 communicating with axial ducts such as 30 for lubricating the bearing between the independently rotatable hubs.

The inboard wheel is mounted on a hub member 35 which is provided with lateral extensions of considerable length on both sides of the radial or web portion of the hub, and these extensions 36 and 37 are internally cylindrical and receive the axially spaced journal bushings 38 and 39.

The radial portion 25 of the hub 20 on its inner face is provided with a relatively deep annular groove in the bottom of which is seated a thrust washer 40 which bears against the finished ends 41 at the outer side of the hub member 35, while at the inner end of the hub member 35 there is provided a similar finished end 42 and a sealing strip 43 which are received within the relatively deep annular groove formed by flange 44 and the inner end of hub extension 27, a second thrust washer 45 being seated in the bottom of this groove. The flange 44 is secured to the inner face of the hub extension 27 by means of the studs 46. The braking means comprise a brake drum for the outer wheel having a brake shoe engaging portion 50 integral with the radially extending portion 51 of the flange 44 which is attached as already described to the hub of the outer wheel. The brake drum 52 for the inner wheel is preferably of substantially the same diameter as portion 50 of the first brake drum, and the two members are likewise preferably of substantially the same mass and width. The brake drum 52 is formed at its inner edge with a peripheral annular flange 53, said flange being provided with a plurality of circumferentially spaced apertures 54. The inner wheel is connected with its brake drum 52 by the cylindrical brake drum enclosing member 56 which is detachably secured to hub member 35 by bolt 13 and to the annular flange 53 of the brake drum by the screw 57.

As shown in Fig. 2, the inner wheel 10 (and both wheels when the wheels are duplicates, as shown) is formed with a plurality of strengthening ribs 62 which join adjacent edges of the lugs 12 of the wheel, the space between the lugs being otherwise entirely unrestricted and allowing the free passage of air. The cylindrical member 56 is provided with a plurality of openings 58 in its surface adjacent the inner wheel, and these openings may be arranged to be in axial alignment with the spaces between the lugs 12. The brake shoe engaging portions 50, 52 of the respective brake drums may be formed on their outside surface with a plurality of annular radiating fins 60, and the total outside peripheral surface of the brake band engaging portion 50 is preferably substantially equal to that of brake drum 52. Brake bands 61 are provided having lining 61' for frictional engagement with the brake drums 50, 52, and these bands may be of any suitable type and anchored and actuated in the conventional manner. An annular plate 65 is affixed to the axle end 15 and protects the brake mechanism from dust and weather.

With the construction shown and described it will be apparent that the simple and compact dual wheel assembly provides separate brakes for the independently rotatable wheels which are amply ventilated for the dissipation of frictional heat generated when the brakes are in operation, and that the braking action will be substantially balanced and uniform despite heavy use, due to the similar reaction of the brake drums to frictional heat of braking.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly the combination of an axle end, an outer wheel rotatably mounted on the axle end and having an extended hub portion, an inner wheel rotatably mounted on the extended hub portion, a brake drum connected to the inner end of the extended hub portion and located at the inner side of the inner wheel, a second brake drum located at the inner side of the first brake drum and in substantially cylindrical alignment therewith, a radially extending annular flange on the inner edge of the second brake drum and a cylindrical member enclosing said brake drums connected to the flange and to the inner wheel whereby the cylindrical member is substantially spaced from the outer surface of the brake drum, said brake drums having brake shoe engaging portions of substantially equal mass and width.

2. A dual wheel construction comprising, in combination, a pair of independently rotatable coaxial side by side dual wheels, a brake drum associated with the outer wheel for rotation therewith located at the inner side of the inner wheel, a second brake drum located at the inner side of the first brake drum and in substantially cylindrical alignment therewith, a radially extending annular flange connected to the second brake drum, a cylindrical member enclosing the brake drums and connected to the flange and the inner wheel, the inner wheel having a plurality of circumferentially spaced apertures in its surface, the cylindrical member having a plurality of circumferentially spaced apertures in its surface adjacent the inner wheel, and the flange having a plurality of circumferentially spaced apertures in its surface, whereby cross ventilation is afforded to the brake drums.

3. A dual wheel construction comprising, in combination, a pair of independently rotatable coaxial side by side dual wheels, the inner wheel having a plurality of circumferentially spaced apertures in its surface, a brake drum associated with the outer wheel for rotation therewith and located at the inner side of the inner wheel, a second brake drum located at the inner side of the first brake drum and in substantially cylindrical alignment therewith, the brake shoe engaging portions of the brake drums being of substantially equal mass and width, a radially extending annular flange on the inner edge of the second brake drum having a plurality of circumferentially spaced apertures in its surface, and a cylindrical member enclosing the brake drums connected to the flange and the inner wheel and having a plurality of circumferentially spaced apertures in its surface adjacent the inner wheel.

4. A dual wheel construction comprising, in combination, an axle end, an outer wheel rotatably mounted on the axle end and having an extended hub portion, an inner wheel rotatably mounted on the extended hub portion, said wheel having a plurality of circumferentially spaced apertures in its surface, a brake drum connected to the inner end of the extended hub portion and located at the inner side of the inner wheel, a second brake drum located at the inner side of the first brake drum and in substantially cylindrical alignment therewith, the brake shoe engaging portion of the brake drums being of substantially equal mass, width and exterior radiating surface, a radially extending annular flange on the inner edge of the second brake drum, said flange having a plurality of circumferentially spaced apertures in its surface, and a cylindrical member enclosing the brake drums connected to the flange and the inner wheel and having a plurality of circumferentially spaced apertures in its surface adjacent the inner wheel.

5. A dual wheel construction comprising, in combination, an axle end, an outer wheel web rotatably mounted on the axle end and having an extended hub portion, an inner wheel web rotatably mounted on the extended hub portion, said wheel web having a plurality of circumferentially spaced apertures in its surface, a brake drum connected to the inner end of the extended hub portion and located at the inner side of the inner wheel web, a second brake drum located at the inner side of the first brake drum and in substantially cylindrical alignment therewith, the brake shoe engaging portion of the brake drums being of substantially equal mass, width and exterior radiating surface, a radially extending annular flange on the inner edge of the second brake drum, said flange having a plurality of circumferentially spaced apertures in its surface, and a cylindrical member with a frusto conical end portion, enclosing the brake drums, connected to the inner wheel at the frusto conical end portion thereof and to the flange at the cylindrical end thereof, whereby the cylindrical member is spaced apart substantially from the outer surface of the brake drums, the cylindrical member having a plurality of circumferentially spaced apertures in its frusto conical portion adjacent the inner wheel.

CHARLES S. ASH.